(12) United States Patent
Brown et al.

(10) Patent No.: US 9,001,409 B2
(45) Date of Patent: *Apr. 7, 2015

(54) ELECTRICALLY ACTIVATABLE LIGHT BLOCKING COVER FOR VEHICLE MIRRORS AND METHOD

(75) Inventors: Alyn Brown, Indianapolis, IN (US); James Wiff, Cologne, MN (US)

(73) Assignee: Control Solutions LLC, Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,193

(22) Filed: Jul. 18, 2012

(65) Prior Publication Data

US 2012/0320330 A1 Dec. 20, 2012

Related U.S. Application Data

(63) Continuation of application No. 12/533,191, filed on Jul. 31, 2009, now Pat. No. 8,248,680.

(51) Int. Cl.
*G02B 26/00* (2006.01)
*G02F 1/01* (2006.01)
*G02F 1/03* (2006.01)
*G02F 1/07* (2006.01)
*G02F 1/15* (2006.01)
*B60R 1/08* (2006.01)
*G02F 1/157* (2006.01)

(52) U.S. Cl.
CPC ................ *B60R 1/088* (2013.01); *G02F 1/157* (2013.01); *G02F 2203/02* (2013.01)

(58) Field of Classification Search
USPC .................... 359/245, 265, 267.15, 291, 296, 359/601–604, 606, 630; 372/45.01, 96, 99; 348/E9.027
See application file for complete search history.

(56) References Cited

U.S. PATENT DOCUMENTS

| | | | |
|---|---|---|---|
| 6,876,479 B1 * | 4/2005 | Giri et al. ...................... | 359/273 |
| 8,248,680 B2 * | 8/2012 | Brown et al. ................. | 359/265 |
| 2005/0083577 A1 * | 4/2005 | Varaprasad et al. .......... | 359/604 |
| 2012/0224248 A1 * | 9/2012 | Schofield et al. ............. | 359/265 |

* cited by examiner

*Primary Examiner* — Mahidere Sahle
(74) *Attorney, Agent, or Firm* — McCracken & Gillen LLC

(57) ABSTRACT

A cover for use in connection with a mirror of a vehicle is provided. The cover is provided with a lens having an electrically activatable material. The lens is positioned in front of the vehicle mirror. The electrically activatable material blocks visible light directed towards the vehicle mirror such that the electrically activatable material prevents the visible light from being reflected off of the vehicle mirror when the electrically activatable material is set to a light inhibiting state. A device that holds the lens is securable to the vehicle mirror. The electrically activatable material of the lens is configured to be switched to the light inhibiting state in response to user operation such that the lens prevents reflection of the visible light off of the vehicle mirror to reduce observability of the vehicle mirror.

41 Claims, 5 Drawing Sheets

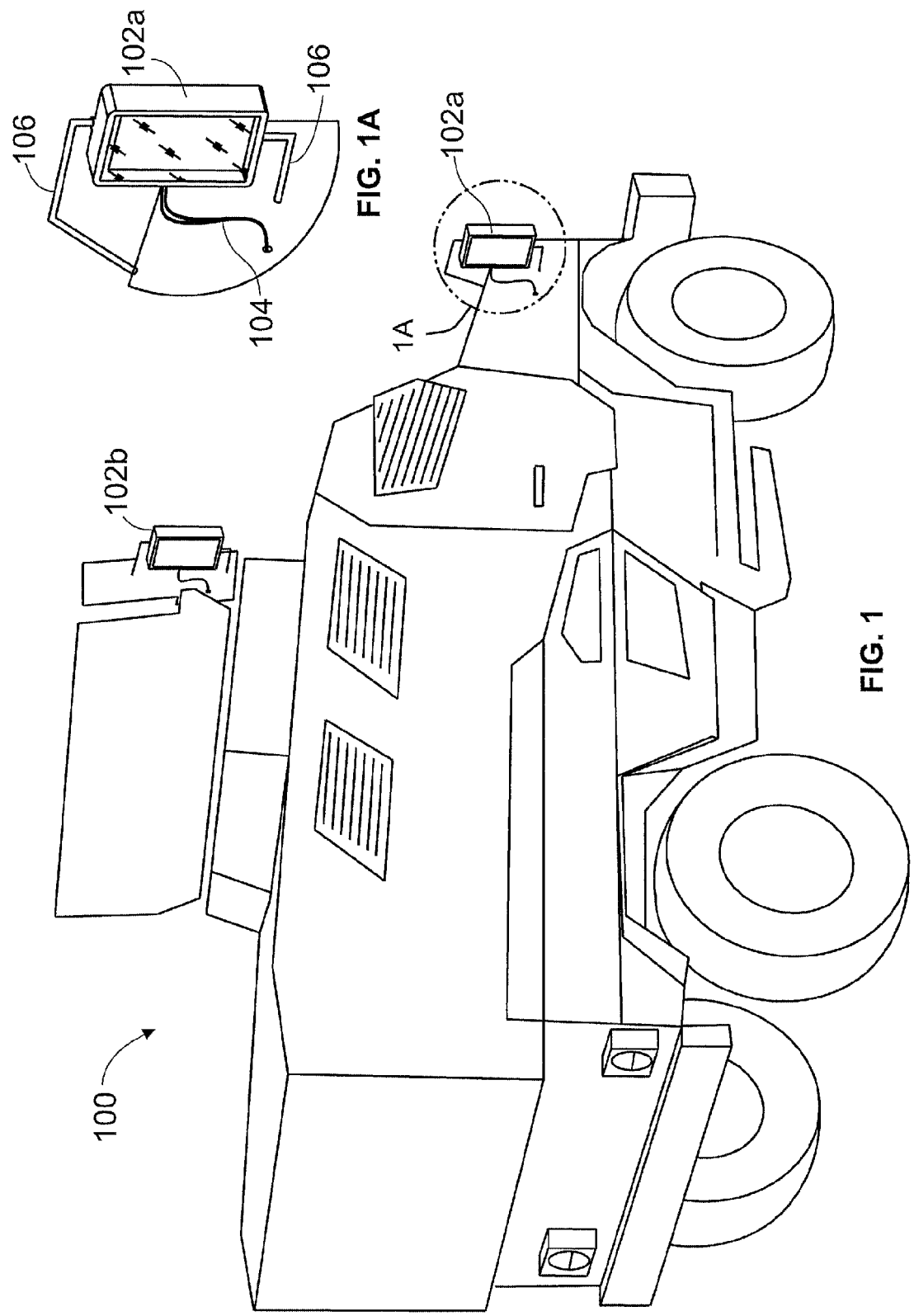

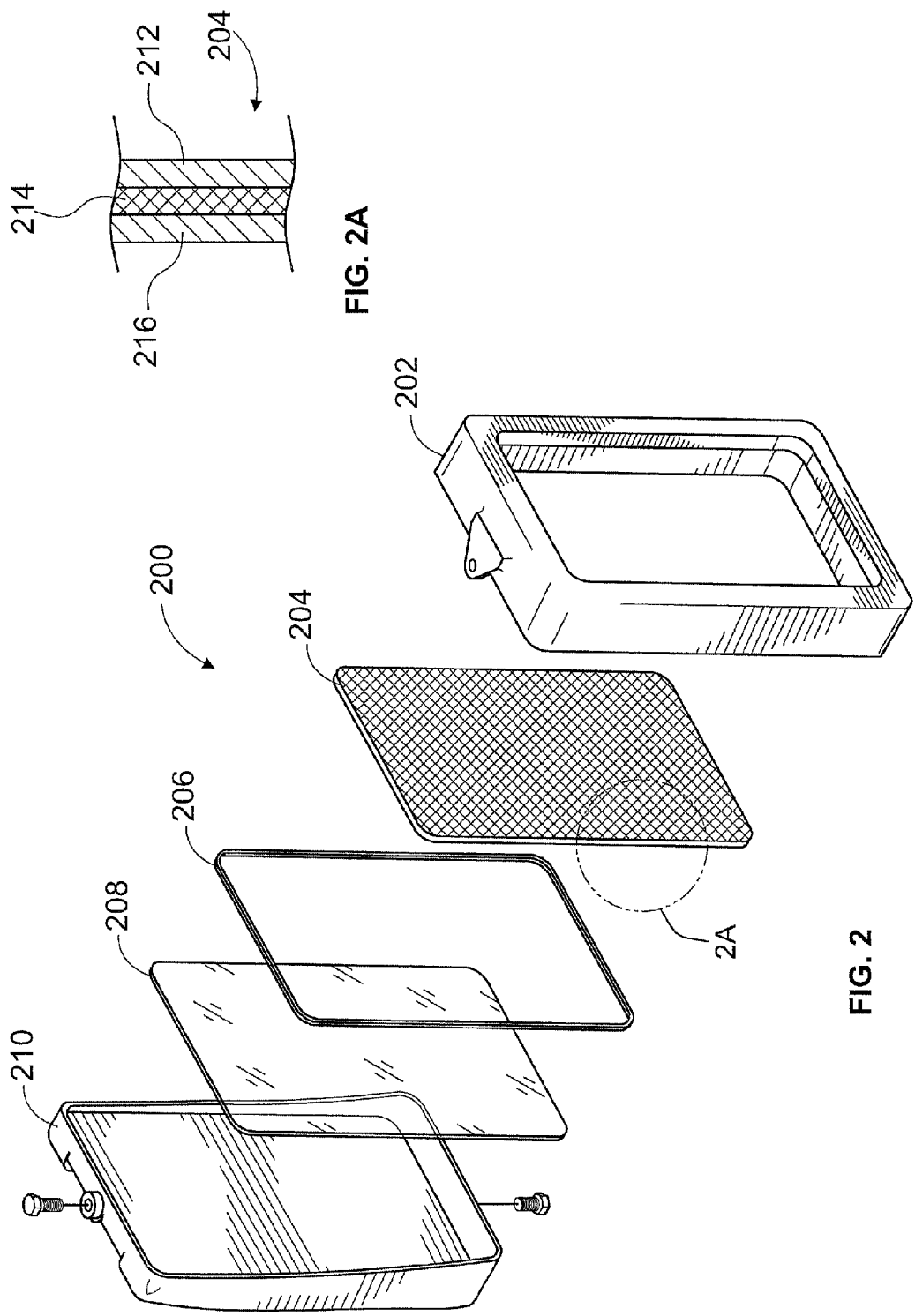

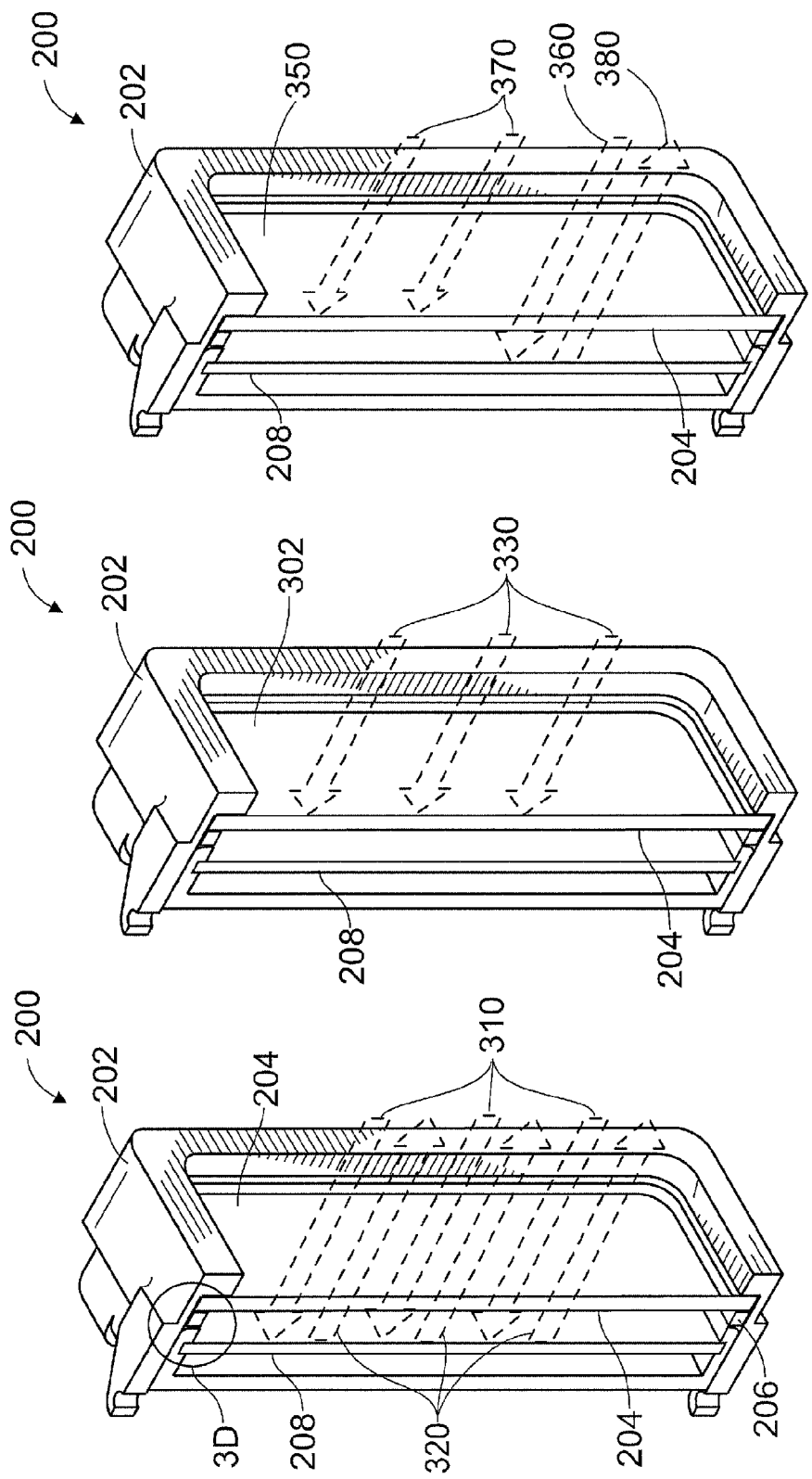

ELECTRICALLY ACTIVATABLE LIGHT BLOCKING COVER FOR VEHICLE MIRRORS AND METHOD

PRIORITY CLAIM AND CROSS-REFERENCE TO RELATED APPLICATION

The application claims priority to parent application Ser. No. 12/533,191, titled "ELECTRICALLY ACTIVATABLE LIGHT BLOCKING COVER FOR VEHICLE MIRRORS" by Alyn Brown and James Wiff filed Jul. 31, 2009 and is incorporated by reference herein.

FIELD OF THE INVENTION

The invention relates to covers used for blocking light from reflecting off vehicle mirrors such as external or internal mirrors of military combat vehicles or security vehicles.

BACKGROUND

Conventional mirrors are designed to reflect ambient light at all times. While this may be desirable in the daytime, trailing vehicles can often blind the driver at night by not having their headlights dimmed and shining the headlights into the mirrors of the driver's vehicle. One approach to address this is to provide two reflective surfaces with different reflectivity characteristics and provide a mechanical adjustment on the mirror to allow for day and nighttime driving. Another approach uses a wedge shaped mirror such that maximum reflectivity (e.g., in a day mode) is accomplished when the image is reflected off the rear portion of the mirror which has the reflective coating. When an alternative mode is desired, such as a night mode, the mirror is adjusted such that the reflected light is reflected off the front glass which has a lower reflectivity than the rear portion.

Other approaches employ interior vehicle mirrors that operate electrochromatically such that they dim reflected light from trailing vehicles. The mirrors are calibrated to react to an amount of ambient light as read by light sensors and are able to adjust the level of reflectivity to reduce the chances of a driver from being blinded by trailing vehicles at night.

For certain vehicles, such as military combat vehicles, it is desirable to provide total non-reflectivity of the mirror during specific times, such as during particular combat operations. For instance, covert and special operations missions are often executed at night and the ability to perform such missions without being observed by enemy forces is key. To prevent any reflectivity off the mirrors during such combat missions, the mirrors are often either removed entirely or moved to a position that masks their reflective surface from observation. For some situations, duct tape may also be placed over the mirrors to prevent light from reflecting. The ability to eliminate the observability of the mirror resulting from light reflection may also be desirable for vehicles used for security purposes. Security vehicles may be vehicles used for special operations purposes, police operations, or private security purposes. The conventional approaches that have been used to prevent light reflection off a vehicle mirror defeat the purpose of having a vehicle mirror and require the time and effort of military or security personnel to move or remove (and then re-install) the mirrors as needed.

Accordingly, there is a need for improved light blocking devices for vehicle mirrors that are adapted to selectively block the reflectivity of ambient light from the mirrors in a convenient manner.

SUMMARY

A cover for use in connection with a mirror of a vehicle is provided. The cover is provided with a lens having an electrically activatable material. The lens is positioned in front of the vehicle mirror. The electrically activatable material blocks visible light directed towards the vehicle mirror such that the electrically activatable material prevents the visible light from being reflected off of the vehicle mirror when the electrically activatable material is set to a light inhibiting state. A device that holds the lens is securable to the vehicle mirror. The electrically activatable material of the lens is configured to be switched to the light inhibiting state in response to user operation such that the lens prevents reflection of the visible light off of the vehicle mirror to reduce observability of the vehicle mirror.

A mirror cover kit is also provided with a bezel substantially sized and shaped to fit over a mirror mounted on a vehicle. A lens having an electrically activatable material that blocks visible light directed towards the mirror such that the electrically activatable material prevents the visible light from being reflected off of the mirror when the electrically activatable mirror is set to a light inhibiting state to reduce observability of the vehicle mirror. A mounting device is provided for mounting and affixing the bezel over a housing of the mirror of the vehicle.

A method of utilizing a cover to reduce the observability of a mirror of a vehicle is also provided. A lens is positioned in front of the vehicle mirror with the lens having an electrically activatable material that blocks visible light directed towards the vehicle mirror such that the electrically activatable material prevents the visible light from being reflected off of the vehicle mirror when the electrically activatable material is set to a light inhibiting state. The electrically activatable material of the lens is switchable from a light passing state to a light inhibiting state such that, in the light inhibiting state, the lens prevents reflection of the visible light off of the vehicle mirror to reduce observability of the vehicle mirror.

BRIEF DESCRIPTION OF THE DRAWINGS

FIG. 1 is a perspective view of a vehicle with covers positioned over the vehicle mirrors;

FIG. 1A is a perspective view of Detail 1A in FIG. 1;

FIG. 2 is an exploded, perspective side view of an example of the cover installed over a vehicle mirror in FIG. 1;

FIG. 2A is a cross-sectional view in Detail 2A in FIG. 2;

FIGS. 3A-3C are perspective side views of the cover in FIG. 2 cut vertically to show the cross-sectional views of the layers shown in FIG. 2;

DETAILED DESCRIPTION

Figure 3D:
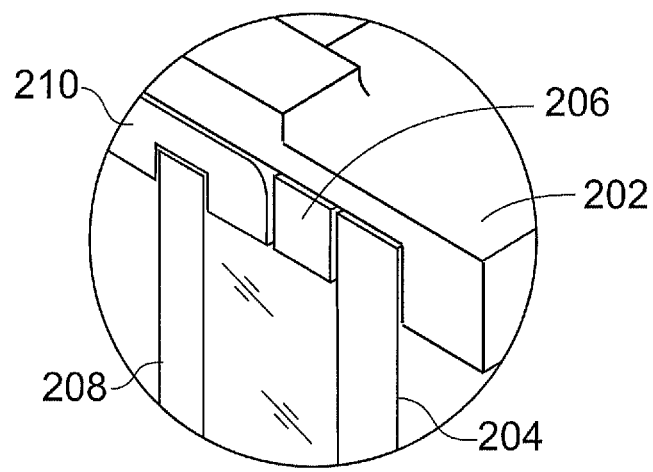
FIG. 3D is a view of the cross-section in FIG. 3A at detail 3D.

FIG. 1 is a perspective view of a vehicle 100 with covers 102a and 102b positioned over the vehicle mirrors. The vehicle 100 may be, for example, a security vehicle, a military vehicle such as a High Mobility Multipurpose Wheeled Vehicle (HMMWV, or "Hummvee"), or any other vehicle that may be used in conditions in which it is desirable that the vehicle remain undetectable. For example, a Hummvee, or other military transport vehicles, may be used to carry military personnel into areas of battlefield conditions. At night, it is desirable to remain undetectable to any enemy personnel that may be in the area. The military vehicle may turn its lights off and even cover the light lenses to avoid reflections off the light assemblies. Current military ground vehicles typically use mirrors to permit drivers to see to the side of the vehicle and behind the vehicle. The vehicle 100 in FIG. 1 may also have mirrors for a gunner to use to see behind the vehicle 100. When the lights are turned off while approaching battlefield conditions, the mirrors may reflect incident light thereby risking detection by enemy personnel. In the military vehicle 100 in FIG. 1, for example, a driver or passenger may activate the mirror covers 102a,b to avoid detection due to incident light reflections from the mirrors. The mirror covers 102a,b may otherwise be in an inactive state that permits incident light to pass through to the mirrors.

FIG. 1A is a perspective view of Detail 1A in FIG. 1 illustrating the mirror cover 102a. The mirror cover 102a may be mounted on the mirror, which is attached to the vehicle 100 using a mirror support structure 106. The mirror cover 102a may also be connected to mirror cover leads 104, which may extend into the vehicle 100 to an actuation device (not shown).

FIG. 2 is an exploded, perspective side view of an example of the cover for installation over a vehicle mirror in FIG. 1. The cover assembly 200 includes a bezel 202 for supporting the cover assembly 200, a lens 204, and a spacer 206. The cover assembly 200 may be configured to fit on an existing mirror assembly on the vehicle. The existing mirror assembly may include a mirror 208, and a housing, or backshell 210 as shown in FIG. 2. FIG. 2A is a cross-sectional view in Detail 2A in FIG. 2, which illustrates the structure of the lens 204. The lens 204, in this example, includes a first transparent layer 212, an electrochromatic layer 214, and a second transparent layer 216. The transparent layers 212, 216 may made of a glass or polycarbonate material, or of a glass material such as plexiglass or a bullet resistant glass. The electrochromatic layer 214 may be laminated to the transparent layers 212, 216, or otherwise assembled as shown in FIG. 2A in a suitable manner. As seen, the lens 204 is positioned in front of the vehicle mirror 208. The lens 204 may be fixed, along with the spacer 206 and mirror 208, to the bezel 202 and the housing 210 using known fixing techniques (for example, adhesive, screws, clips, etc.). The mirror 208 may be held in housing 210 by spacer 206. Spacer 206 may further be used to hold the lens 204 with the front portion of the lens seated within the bezel housing 202. The bezel 202 and housing 210 form an enclosure for keeping the cover assembly 200 assembled. The bezel 202 may be releasably secured over the vehicle mirror 208. In an alternative embodiment, the bezel 202 may have one or more rims that provide snap-on securement of the bezel to the vehicle mirror housing. Alternatively, the bezel 202 may be releasably securable to the back housing 210 by releasably securable clips or straps.

In normal operation, the lens 204 may be turned 'off' to allow visible light to pass through to the reflective surface of the mirror 208. The reflective surface of the mirror 208 reflects any incident light through the lens 204. In conditions in which the driver of the vehicle desires to be undetectable, the driver or a passenger may switch an actuator that darkens the mirror cover 200. The mirror cover 200 may then inhibit and prevent visible light from passing electrically activatable film 214 of the lens 204 in either direction. Incident light is inhibited and prevented from passing through the electrically activatable film 214, or from passing reflected light from the mirror 208.

In an example implementation, the electrically activatable film 214 may include an electrochromatic polymer (ECP) film, a material used in liquid crystal displays (LCD), and/or organic materials, such as organic materials that may be used in LCDs. One example type of ECP material activates when a voltage of 1 VDC is applied to the film.

As seen, the electrically activatable material 214 may be provided in various constructions, such as a film that can be disposed between transparent layers. Other material constructions may use a vapor deposition process on two adjacent faces of two layers of material and some with additional liquid material in between, for example. Electrical activation maybe applied to the two layers, for example, causing migration of certain elements to one layer or the other producing a desired effect. In another example, a suspended particle device (SPD) film may be used with an inverter that produces AC voltage to drive the film. The electrically activatable material may also include phase dispersed liquid crystals (PDLCs), materials known as SageGlass® from Sage Electrochromics, Inc., and electrochromatic materials provided by Chromogenics AB.

In general, the film may determine how the mirror cover 200 is activated. Two scenarios include:
1. A film that is energized to a light inhibiting state;
2. A film that is de-energized to a light inhibiting state.

In one example, the film may include multiple layers each having specific functions. For example, the film may include an electrochromopore, an electrolyte layer, and an ion storage layer. In such films, the electrolyte layer is typically a liquid or a gel. In another example, the film may be a rigid or flexible electrochromatic polymer that maybe cast from solution on a glass or poly(ethylene terephthalate) ("PET") substrate. The assembly may then be heated under pressure to laminate the structures. The laminated assembly may include optically transparent electrodes, such as for example, indium tin oxide (ITO) layers that maybe deposited on the glass or PET substrate and configured for connection to a power supply.

In another implementation, the film may include electrochromic glazing consisting of five thin-film ceramic layers coated directly onto glass. Electrochromic glazing maybe implemented similar to low-emissivity glazing used to make energy efficient windows, but in a circuit that enables switching between light transmission or light blocking as desired.

In another implementation, the film may a suspended particles device (SPD), which uses small light-absorbing particles, otherwise known as "light valves." For example, a SPD may be sandwiched between glass or plastic layers and connected via electrical leads to an AC power source. In the 'off' state, the particles are randomly distributed in the SPD and block light incident on the glass or plastic wall from passing through. In the 'on' state, the particles are aligned and allow the incident light to pass through.

In another implementation, a liquid-crystal sheet maybe bonded between two layers of glass. The liquid crystal sheet may be connected to a power source. When switched to the 'on' state, the voltage rearranges the liquid-crystal molecules to allow light to pass through the glass. When switched to the "off" state, the liquid-crystal molecules disperse light making the device opaque.

In some implementations, a selected film maybe rigid enough to implement as a single layer precluding the need for other transparent layers 212, 216 (in FIG. 2A). In other implementations, the film may be laminated on one side of a transparent layer 212 or 216. In certain embodiments, two or more layers of the film placed adjacent to one another may be used to achieve enhanced light blocking capabilities.

FIGS. 3A-3 C are perspective side views of the cover assembly 200 and mirror assembly, including the mirror 208 and backshell 210 as shown in FIG. 2 assembled and cut vertically to show the cross-sectional view of the layers shown in FIG. 2. FIGS. 3A-3C illustrate various states of operation of the mirror covers 200 when incident light is directed towards the mirror.

FIG. 3A shows the mirror cover 200, which includes the lens 204. The mirror cover 200 in FIG. 3A is in an inactive state, in which incident light 310 passes through the lens 204 to the mirror 208. The incident light 310 reflects off of the mirror layer 208 as reflected light 320 to enable normal use of the mirror.

FIG. 3B shows the mirror cover 200 in an active or light inhibiting state. In the light inhibiting state, the lens 204 turns substantially opaque and inhibits the passage of incident light 330 through the lens 204. By preventing the incident light 330 from passing through the lens 204, the mirror cover 200 operates to inhibit reflection of the incident light 330 off the mirror and thereby inhibiting detection of the vehicle.

FIG. 3C shows an application in which the mirror cover 200 includes an electro chromatic material that selectively allows light having wavelengths in a selected range to pass through while blocking light in other wavelengths ranges. In FIG. 3C, selected incident light 360 in a selected wavelength range is allowed to pass through the mirror cover 200 and reflect off the reflective surface of the mirror 208. Other incident light 370 in another wavelength range is blocked. In the application illustrated by FIG. 3C, the selected wavelength range for the incident light allowed to pass at 360 may be for light in the range from 700 nanometers to a 1200 nanometers.

In another example, the selected wavelength maybe in the infrared spectrum, for example. While light that is visible with the naked eye may be blocked at lens 204, light in the infrared may be allowed to pass and reflect off the reflective surface of the mirror 208. In this manner, a vehicle may be detected by friendly personnel equipped with detectors able to detect the reflected infrared light 380. The non-infrared incident light 370, including visible light, would be blocked allowing the vehicle to escape detection by enemy personnel that lack detectors of infrared, such as for example, night vision goggles (NVG).

FIG. 3D is a view of the cross-section in FIG. 3A at detail 3D. FIG. 3D shows the upper frame portion of the bezel 202, the lens 204, the spacer 206, and how it may fit on the backshell 210, which holds the mirror 208.

Figure 4:
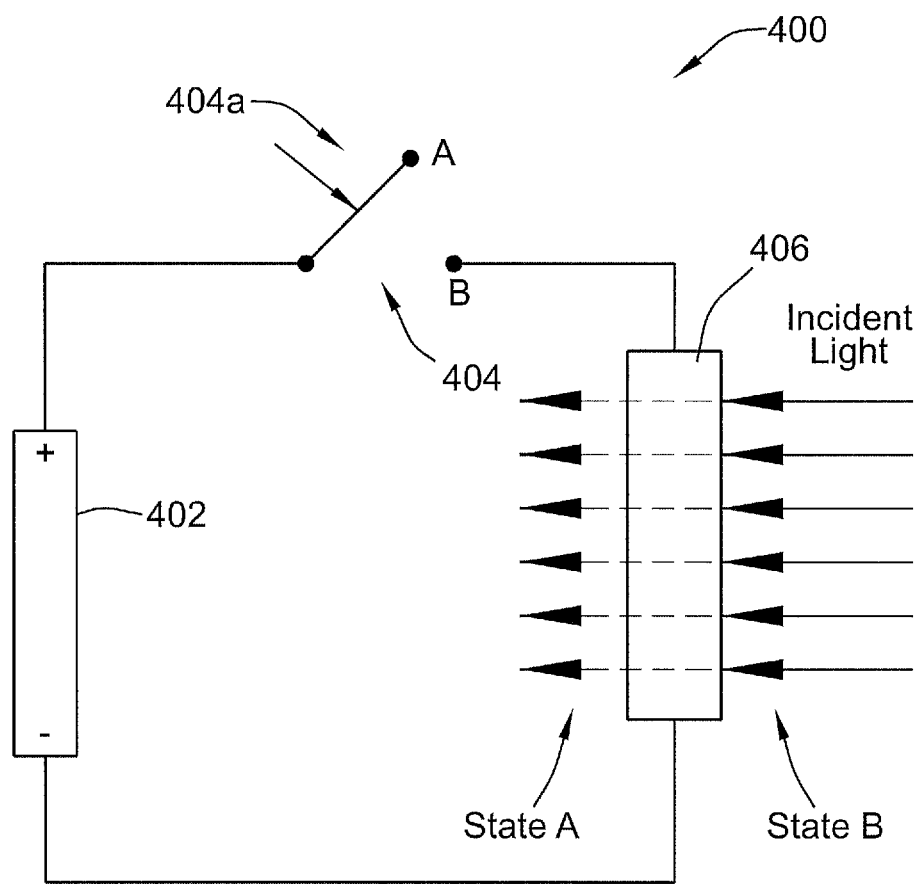
FIG. 4 is a schematic circuit diagram illustrating operation of an example mirror cover.

FIG. 4 is a schematic circuit diagram illustrating operation of an example mirror cover. FIG. 4 shows a circuit 400 that includes a power supply 402 as an electrical power source, an electrical coupling device 404, and a mirror cover 406. The electrical coupling device 404 may be any device adapted to electrically couple the electrically activatable material in the mirror cover 406 to the power supply 402. The electrical coupling device 404 in FIG. 4 is shown as a switch that may be set to one of two states: State A or State B. In State A, the electrical coupling device 404 is open disabling the transfer of power from the power supply 402 to the mirror cover 406. State A is shown in FIG. 4 to allow incident light to pass through the mirror cover 406 to reflect off of the reflective surface of the mirror (not shown in FIG. 4). State A represents normal operation in the example illustrated by FIG. 4.

When the electrical coupling device 404 is closed to State B, power is coupled from the power supply 402 to the mirror cover 406 to inhibit incident light from passing through the mirror cover 406. It is noted that the example shown in FIG. 4 assumes that the mirror cover 406 includes a film 214 (see FIG. 2A) that inhibits light when electrically energized. That is, the electrically activatable material becomes opaque upon being electrically energized and the electrically activatable material becomes transparent upon being electrically de-energized. The electrically activatable material becomes electrically energized upon reaching a voltage potential threshold such that the lens does not allow the transmission of ambient light into the reflective surface of the mirror 208 (see FIG. 2).

In an example in which the film 214 inhibits light when electrically de-energized, States A and B would provide the opposite operation as that indicated above. That is, the electrically activatable material becomes opaque upon being electrically de-energized and the electrically activatable material becomes transparent upon being electrically energized. The electrically activatable material becomes electrically de-energized upon removal of a voltage potential threshold such that the lens does not allow the transmission of incident light to the reflective surface of the mirror.

In another example, the film 214 may be in one state, such as opaque or transparent, with a voltage having a first polarity (for example, +/−) applied to it, and switch to the other state, such as transparent or opaque, when the polarity is switched (for example, to −/+).

The electrical coupling device 404 in FIG. 4 is depicted with a switch actuator 404a, or actuation device, illustrating alternative ways to change the state of the electrical coupling device 404. For example, the electrical coupling device 404 may be an on/off switch in a control panel accessible by a user in the cabin of the vehicle. The user may manually switch the electrical coupling device 404 from off to on, or vice versa depending on whether the user desires to be detectable. Referring to the example described above, the user may switch the switch 404 from State A (off) to State B (on) to block light and blackout the vehicle.

The switch actuator 404a may also be implemented as a toggle switch, a button, an actuator on a touch panel screen, or a sensor such as a photocell sensor with switch capabilities upon sensing light activity. The actuation device 404a may be any actuator employed to initiate change of operation modes.

The switch actuator 404a may be a hardwired switch, a software controlled switch or a wireless control. For example, the switch actuator 404a may be an electronic switch connected to a controller that controls the mirror cover 406 systematically. For example, a control panel may be configured to place a vehicle in a battlefield condition such that activation of the mirror cover 406 is one function performed to place the vehicle in battlefield condition. The electrical coupling device 404 may also be implemented using a wireless connection to a control panel that may or may not be located in the vehicle itself. In alternative arrangements, electrical coupling device 404 may simply be an electrical conductor, such as a cable or copper wiring to electrically couple the electrically activatable material to a power source 402.

The power supply 402 may include the vehicle power supply coupled to the cover 406 via a control panel in the vehicle. The power supply 402 may also include a vehicle battery coupled via a control panel of the vehicle. The power supply 402 may also include an accessory battery coupled via a control panel adapted to re-charge the accessory battery based on conditions of a vehicle battery.

Figure 5:
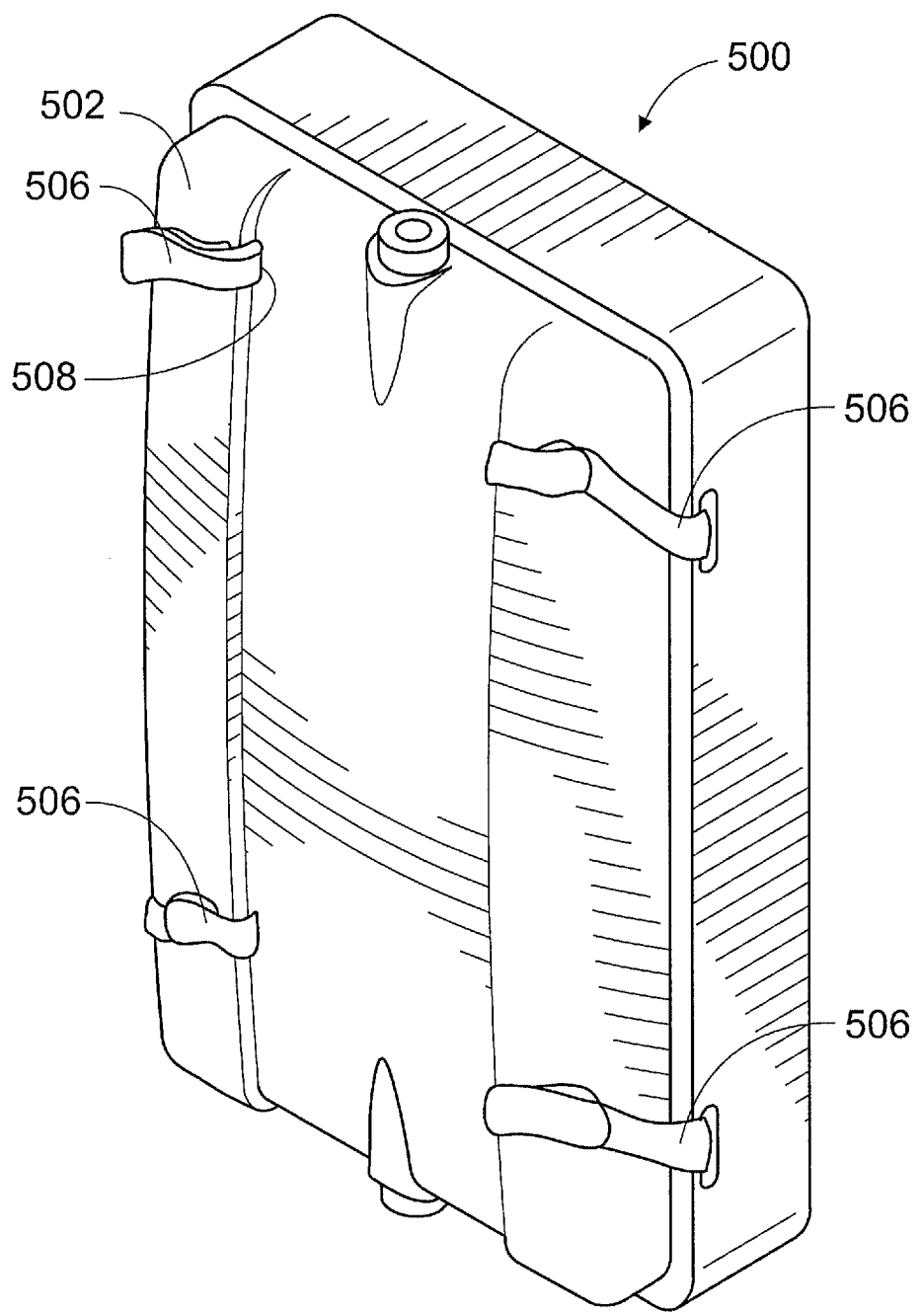
FIG. 5 is a back perspective view of another example of a cover having releasably securable clips or straps.

FIG. 5 is a perspective view of an example of a mirror cover 500 attached to a vehicle mirror 502. The mirror cover 500 is attached to the mirror 502 using four clips 506 that may "hook" to the backside of the mirror 502 at 508. The tension of the clips 506 may be adjusted to provide a tight fit over the mirror 502. Alternatively, releasably securable straps 506 may be used to aid in securing the front bezel of the cover 500 to the backshell housing the mirror. The view in FIG. 5 is from behind the mirror 502. The lens having the electrically activatable film is on the opposite side of the mirror 502 shown in FIG. 5.

The example mirror cover 500 in FIG. 5 illustrates implementation of a mirror cover kit that may be implemented for use with vehicles that may already be in the field. Different kits may implemented for different models according to the mirrors installed on the vehicles. The mirror cover 500 in the kits may have different dimensions, shapes and may implement different ways of attaching to the mirror and use various mounting devices for mounting and affixing a front bezel to the cover housing. The clips 506 shown in FIG. 5 conform to the shape and contour of the back of the mirror 502. Other examples may include straps or belts that go around the mirror 500 and may be fastened and tightened.

As seen, a method of utilizing the electrically activatable light blocking cover to reduce and eliminate the observability of a vehicle mirror during certain modes of operation is provided. The lens may be placed in a bezel of the cover. The lens is then positioned in front of the vehicle mirror. The lens has an electrically activatable material that is able to be electrically coupled with an electrical power source. The electrically activatable material of the lens is switched from a light passing state in which ambient light is permitted to pass through the lens for reflection off the mirror to a light inhibiting state in which the lens prevents the reflectivity of visible light off the vehicle mirror to reduce observability of the vehicle mirror. The electrically activatable material, for example, may be one or more layers of an eletrochromatic film that are positioned between layers of transparent glass material of the lens.

The blocking capabilities of the electrically activatable material may be such that substantially all ambient light is blocked out from reflecting off the vehicle mirror when the electrically activatable material is set to the light inhibiting state. In alternative arrangements, the lens may selectively pass light of a particular spectrum (such as infrared light ranging from approximately 700 nanometers to approximately 1200 nanometers) to the mirror for reflection and block out light at wavelengths outside the spectrum. In one example, the electrically activatable material becomes opaque when electrically energized and becomes transparent when it is electrically de-energized. Alternatively, the electrically activatable material may become opaque when it is electrically de-energized and become transparent when it is electrically energized. The cover may be adapted for retrofit installation. The lens, for instance, may be positioned and held in the bezel of the cover. The bezel may then be secured over the housing of the vehicle mirror by securable straps or clips.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A cover for use in connection with a mirror of a vehicle, comprising:
   a lens configured to be positioned in front of the vehicle mirror, the lens having an electrically activatable material that comprises at least one layer of electrochromatic film, the electrically activatable material blocks visible light directed towards the vehicle mirror such that the electrically activatable material prevents the visible light from being reflected off of the vehicle mirror when the electrically activatable material is set to a light inhibiting state, the electrically activatable material is coupled to an electric power source wherein the electrical power source comprises at least one of vehicle power, a vehicle battery, and an accessory battery coupled to the vehicle battery; and
   wherein the electrically activatable material of the lens is configured to be switched to the light inhibiting state such that the lens prevents reflection of the visible light off of the vehicle mirror to reduce observability of the vehicle mirror.

2. The cover of claim 1 wherein the at least one layer of electrochromatic film is affixed to at least one layer of a transparent material of the lens.

3. The cover of claim 1 wherein the electrochromatic film is disposed between layers of transparent material of the lens.

4. The cover of claim 1 wherein the device further comprises a bezel, the bezel holds the lens and is configured to be removably affixed to the vehicle mirror.

5. The cover of claim 1 wherein the vehicle mirror is a military combat vehicle mirror or a security vehicle mirror and wherein the electrically activatable material comprises at least one of:
   (a) suspended particle device (SPD) material;
   (b) liquid crystal display (LCD) material; and
   (c) phase dispersed liquid crystals (PDLCs).

6. The cover of claim 5 wherein the electrically activatable material is configured to block out substantially all ambient light from reflecting off the mirror when the electrically activatable material is set to the light inhibiting state.

7. The cover of claim 5 wherein the electrically activatable material is configured to selectively pass light of a particular spectrum to the mirror for reflection and block out light at wavelengths outside of the spectrum.

8. The cover of claim 5 wherein the electrically activatable material is configured to selectively pass infrared light to be reflected off the mirror while the electrically activatable material blocks visible light directed towards the mirror.

9. The cover of claim 8 wherein the electrically activatable material selectively passes light ranging from 700 nanometers to 1200 nanometers.

10. The cover of claim 1 wherein the device further comprises a bezel that holds the lens and wherein the bezel is configured to be releasably secured over the vehicle mirror.

11. The cover of claim 10 wherein the bezel comprises at least one rim adapted for snap-on securement of the bezel to the vehicle mirror.

12. The cover of claim 10 wherein the bezel is releasably securable to a back housing containing the vehicle mirror by a plurality of releasably securable clips or straps.

13. The cover of claim 1 wherein the electrically activatable material becomes opaque upon being electrically energized and the electrically activatable material becomes transparent upon being electrically de-energized.

14. The cover of claim 13 wherein the electrically activatable material becomes electrically energized upon reaching a voltage potential threshold such that the lens does not allow the reflectivity of ambient light off the vehicle mirror when the electrically activatable material is electrically energized.

15. The cover of claim 1 wherein the electrically activatable material is configured to block ambient light from reflecting off the mirror upon being electrically energized.

16. The cover of claim 1 wherein the electrically activatable material becomes opaque upon being electrically de-energized and the electrically activatable material becomes transparent upon being electrically energized.

17. The cover of claim 16 wherein the electrically activatable material becomes electrically de-energized upon removal of a voltage potential threshold such that the lens does not allow the reflectivity of ambient light off the vehicle mirror when the electrically activatable material is electrically de-energized.

18. The cover of claim 16 wherein the electrically activatable material is configured to block ambient light from reflecting off the mirror upon being electrically de-energized.

19. The cover of claim 1 further comprising a coupling device configured to electrically couple, at least in part, the electrically activatable material to the electrical power source; and
an actuator configured to set the electrically activatable material of the lens to the light inhibiting state in response to user operation.

20. The cover of claim 19 wherein the actuator is positioned at a control panel within the vehicle and wherein the actuator comprises at least one of:
(a) a switch;
(b) panel touch screen;
(c) button; and
(d) sensor.

21. The cover of claim 19 wherein the actuator comprises at least one of: (a) a hardwired switch; (b) a software switch; and (c) wireless control.

22. The cover of claim 19 wherein the at least one of the vehicle power, the vehicle battery, and the accessory battery is coupled with a control panel of the vehicle.

23. The cover of claim 19 wherein the electrical power source comprises the vehicle battery and wherein the vehicle battery is coupled with a control panel of the vehicle.

24. The cover of claim 19 wherein the electrical power source comprises the accessory battery and wherein the accessory battery is coupled with the control panel, the control panel is configured to re-charge the accessory battery based on conditions of a vehicle battery.

25. A mirror cover kit comprising:
a bezel substantially sized and shaped to fit over a mirror mounted on a vehicle;
a lens having an electrically activatable material that blocks visible light directed towards the mirror such that the electrically activatable material prevents the visible light from being reflected off of the mirror when the electrically activatable material is set to a light inhibiting state to reduce observability of the vehicle mirror, wherein the electrically activatable material comprises at least one layer of electrochromatic film and wherein the electrochromatic film is disposed between layers of transparent material of the lens; and
a mounting device configured to mount and affix the bezel over a housing of the mirror of the vehicle.

26. The mirror cover kit of claim 25 wherein the mounting device further comprises clips or straps.

27. A method of utilizing a cover to reduce the observability of a mirror of a vehicle, comprising:
positioning a lens adjacent to the vehicle mirror, the lens having an electrically activatable material in which the electrically activatable material blocks visible light directed towards the vehicle mirror such that the electrically activatable material prevents the visible light from being reflected off of the vehicle mirror when the electrically activatable material is set to a light inhibiting state, wherein the electrically activatable material comprises at least one layer of electrochromatic film;
electrically coupling the electrically activatable material with an electrical power source, wherein the electrical power source comprises at least one of vehicle power, a vehicle battery, and an accessory battery coupled to the vehicle battery; and
switching the electrically activatable material of the lens from a light passing state to the light inhibiting state such that, in the light inhibiting state, the lens prevents reflection of the visible light off of the vehicle mirror to reduce observability of the vehicle mirror.

28. The method of claim 27 wherein the at least one layer of electrochromatic film is positioned between layers of transparent material of the lens.

29. The method of claim 27 further comprising placing the lens in a bezel configured to be removably affixed to the vehicle mirror.

30. The method of claim 27 wherein the vehicle mirror is a military combat vehicle mirror or a security vehicle mirror and wherein the electrically activatable material comprises at least one of:
(a) suspended particle device (SPD) material;
(b) liquid crystal display (LCD) material; and
(c) phase dispersed liquid crystals (PDLCs).

31. The method of claim 30 further comprising blocking out substantially all ambient light from reflecting off the mirror when the electrically activatable material is set to the light inhibiting state.

32. The method of claim 30 further comprising selectivity passing light of a particular spectrum to the mirror for reflection and blocking out light at wavelengths outside of the spectrum.

33. The method of claim 30 further comprising selectively passing infrared light to be reflected off the mirror and blocking out visible light while the electrically activatable material blocks visible light directed towards the mirror.

34. The method of claim 33 further comprising selectively passing light ranging from 700 nanometers to 1200 nanometers through the lens.

35. The method of claim 27 wherein the lens is held in a bezel of the cover and further comprising releasably securing the bezel over the vehicle mirror.

36. The method of claim 35 further comprising releasably securing the bezel to a back housing containing the vehicle mirror by a plurality of securable clip or straps.

37. The method of claim 27 further comprising electrically energizing the electrically activatable material such that the electrically activatable material becomes opaque, and de-energizing the electrically activatable material such that electrically activatable material becomes transparent.

38. The method of claim 27 further comprising electrically de-energizing the electrically activatable material such that the electrically activatable material becomes opaque, and electrically energizing the electrically activatable material such that the electrically activatable material becomes transparent.

39. The method of claim 27 wherein the electrical power source comprises vehicle power and further comprising coupling the vehicle power with a control panel of the vehicle.

40. The method of claim 27 wherein the electrical power source comprises the vehicle battery and further comprising coupling the vehicle battery with a control panel of the vehicle.

41. The method of claim 27 wherein the electrical power source comprises the accessory battery and further comprising coupling the accessory battery with a control panel, and re-charging the accessory battery based on conditions of a vehicle battery.

* * * * *